United States Patent

[11] 3,607,287

[72] Inventor Dieter Bohm
Niederwalluf, Rheingau, Germany
[21] Appl. No. 888,837
[22] Filed Dec. 29, 1969
[45] Patented Sept. 21, 1971
[73] Assignee Keuffel & Esser Company
Morristown, N.J.
[32] Priority Dec. 30, 1968
[33] Germany
[31] P 18 17 417.9

[54] NEGATIVE-WORKING TWO-COMPONENT DIAZOSULFONATE MATERIAL
3 Claims, No Drawings

[52] U.S. Cl. .......... 96/91 R, 96/49
[51] Int. Cl. .......... G03c 1/56, G03c 1/60
[50] Field of Search .......... 96/49, 75, 91

[56] References Cited

UNITED STATES PATENTS

| | | | |
|---|---|---|---|
| 2,197,456 | 4/1940 | Von Poser et al. | 96/91 |
| 2,429,249 | 10/1947 | Von Glahn et al. | 96/49 X |
| 2,694,009 | 11/1954 | Sus | 96/49 X |
| 2,854,338 | 9/1958 | Herrick et al. | 96/49 X |
| 3,248,220 | 4/1966 | Van Rhijn | 96/91 |
| 3,353,984 | 11/1967 | Landau | 96/91 X |
| 3,386,828 | 6/1968 | Slimowicz | 96/91 |
| 3,479,183 | 11/1969 | Habib et al. | 96/75 X |
| 3,512,978 | 5/1970 | Lubar | 96/49 |

OTHER REFERENCES

Kosar, J., " Light-Sensitive Systems," 1965, p. 295.

*Primary Examiner*—Norman G. Torchin
*Assistant Examiner*—Charles L. Bowers, Jr.
*Attorneys*—J. Russell Juten, Peter F. Willig, Lionel N. White and Milford A. Juten

ABSTRACT: The storage stability and useful life of negative-working two-component diazo-type material is extended by including a polyether of a dihydric aliphatic alcohol in the light-sensitive composition with a light-sensitive diazosulphonate and an azo coupler component.

NEGATIVE-WORKING TWO-COMPONENT DIAZOSULFONATE MATERIAL

BACKGROUND

Diazo-type materials containing diazo diazosulfonates as light-sensitive compounds are known. In contradistinction to usual diazo-type materials containing light-sensitive diazonium compounds, exposure to light of materials containing diazo sulfonates leads to colored image parts directly in the exposed areas whereas the uncolored parts of the background require fixation for being protected from further undesired exposure to light. Fixation may e performed, for example, by treating the exposed copy with an aqueous solution of a weak to moderately strong acid and by full exposure to actinic radiation.

Materials of this type are described in U.S. Pat. No. 2,217,189; 2,429,249; 2,861,065; and 3,312,551.

The hitherto known diazo-type materials of this kind have the disadvantage of a relatively poor storability. For improving the storability, it has been suggested, for example, to add sodium bisulphite addition products of certain carbonyl compounds to the reproduction layer. Such additives impede premature coupling between the diazo compound and the coupling component, but simultaneously reduce the light-sensitivity of the materials. The known diazosulfonate layers have the further disadvantage that their light-sensitivity decreases during storage. This means that the increasing age of the reproduction material requires longer and longer exposure times for achieving the contrast achieved with freshly produced material during a certain exposure time.

SUMMARY

According to the present invention a two-component diazo-type material contains a light-sensitive diazo sulfonate and a coupling component in a light-sensitive layer on a suitable support and additionally contains in the layer a polyether of a dihydric aliphatic alcohol. The resulting negative-working diazo-type material has high initial light-sensitivity and retains this light-sensitivity level and capability of dye formation over greater storage periods than similar diazo-type material without added polyether.

DESCRIPTION

Preferably suitable polyethers are polyethylene glycols. Particularly efficient polyethylene glycols have molecular weights above about 400. The polyethylene glycols of lower molecular weights are fluid and, when being used on paper supports, particularly in higher concentrations, thus have the undesirable effect that the solutions prepared therewith do not adhere to the paper surface during coating but penetrate into the paper and may come through to the back side. For sensitizing supports which are not readily penetrated by fluids, e.g. cellulose esters or polyvinyl esters, it is also advantageous, of course, to use lower molecular weight polyethylene glycols. High-molecular weight polyethylene glycols are suitable up to molecular weights of about 10,000 and more.

Polyethers other than polyethylene glycols, e.g. polypropylene glycols and polybutylene glycols also have a similarly advantageous effect. But they generally are less preferred since they are too little water-soluble, particularly in the case of higher molecular weights. To a certain degree, thy may be added to sensitizing solutions, however, when the latter contain mixtures of higher quantities of alcohols as solvents and are particularly useful in sensitizing lacquer layers for film or paper supports. Copolyethers may similarly be employed.

When using a polyethylene glycol as the polyether, it generally is incorporated into the layer in a quantity of about 0.25 to about 10 parts by weight per part by weight of diazo sulfonate. In the case of quantities below 0.25 part by weight, the effect often is too small. Quantities of more than 10 parts by weight may be employed but usually do not improve the effect. Within the given limits, the most favorable quantities may vary depending on the molecular weight of the polyether, the nature and the molecular weight of the diazo sulfonate, and the nature and the quantity of the other layer constituents. In every case, the most favorable quantity can easily be determined by simple tests. It preferably exceeds the quantity of diazo sulfonate.

The diazo-type material of the invention may further contain known and usual additives in the light-sensitive layer. It is thus possible to add, for example, water-soluble carbonyl compounds, such as alkali metal salts of benzaldehyde sulfonic acids, for increasing the light-sensitivity; solubilizers, such as caffeine, wetting agents, acid amides, thiourea, and the like. For increasing the stability, the layer, furthermore, advantageously contains a base, e.g. triethanol amine.

Diazosulfonates suitable for use in the diazo-type material of the invention are known and some are described, for example, in the aforementioned U.S. patents. As coupling components, there may also be employed the compounds known and commonly used in the diazo-type field.

The diazo-type material of the invention may contain as the support the usual materials, such as photoprinting paper, tracing cloth, transparent paper, plastics films, and the like.

PREFERRED EMBODIMENTS

Example 1

A usual photoprinting base paper was provided with a precoat of colloidal silica and casein and then sensitized with a solution of the following composition:

5 l. of water, 400 g. of caffeine, 300 g. of the sodium salt of benzaldehyde-2-sulfonic acid, 100 g. of 2-hydroxy-3-(β-hydroxy-ethylamidocarbonyl)-naphtalene, 150 ml. of glycerol, 10 g. of anionic wetting agent (sodium alkyl sulfonate from saturated hydrocarbons having a boiling range from 230 to 320° C.), 180 g. of sodium-2, 5-diethoxy-4benzoylamino-benzenediazo-sulflonate, 250 ml. of triethanol amine, 1,000 g. of polyethylene glycol 1,000

The dried diazo-type material was exposed to light under a master for sufficient time to develop a visible dye image and then fixed by the application of a 15 percent aqueous citric acid solution and full exposure to light. A high-contrast blue negative copy of the original was obtained.

In another test, the unexposed diazo-type material was stored for 3 days in the air-conditioning cabinet at 40° C. and 65 percent relative humidity. A copy prepared with the stored material under the same conditions as those described above showed no substantial contrast decrease compared with the copy obtained above.

Examples 2 to 6

5 sheets of photoprinting base paper were precoated as described in example 1 and each sensitized with one of the following solutions:

| Example | 2 | 3 | 4 | 5 | 6 |
|---|---|---|---|---|---|
| Water | 5 l. | 5 l. | 5 l. | 5 l. | 5 l. |
| Caffeine | 400 g. | 400 g. | 400 g. | 400 g. | 400 g. |
| Thiourea | 1,000 g. | 1,000 g. | 1,000 g. | 1,000 g. | 1,000 g. |
| Sodium salt of benzaldehyde-2-sulphonic acid. | 300 g. | 300 g. | 300 g. | 300 g. | 300 g. |
| 2-hydroxy-3-(β-hydroxyethylamidocarbonyl)-naphthalene. | 100 g. | 100 g. | 100 g. | 100 g. | 100 g. |
| Glycerol | 150 ml. | 150 ml. | 150 ml. | 150 ml. | 150 ml. |
| Anionic wetting agent (sodium alkyl sulphonate from saturated hydrocarbons having a boiling range from 230 to 320° C). | 10 g. | 10 g. | 10 g. | 10 g. | 10 g. |

Table – Continued

| | | | | | |
|---|---|---|---|---|---|
| Sodium-2,5-diethoxy-4-benzoyl-aminobenzene-diazosulphonate. | 180 g. | 180 g. | 180 g. | 180 g. | 180 g. |
| Triethanol amine | 250 ml. | 250 ml. | 250 ml. | 250 ml. | 250 ml. |
| Polyethylene glycol 400 | | 250 g. | | | |
| Polyethylene glycol 600 | | | 250 g. | | |
| Polyethylene glycol 1,000. | | | | 250 g. | |
| Polyethylene glycol 2,000. | | | | | 250 g. |

The photoprinting materials thus prepared were stored for 3 days in the air-conditioning cabinet. During storage samples of the papers were taken and exposed for 5 minutes to a carbon arc lamp and fixed as described in example 1. Remission of the samples was measured by means of a Photometer ELKO II of Messrs. Carl Zeiss with the use of a Y filter.

EXAMPLES

| Storage Time (Days) | 2 | 3 | 4 | 5 | 6 |
|---|---|---|---|---|---|
| 0 | 4.6 | 5.0 | 4.8 | 4.7 | 4.2 |
| 1 | 8.0 | 6.8 | 6.6 | 6.6 | 6.7 |
| 2 | 8.4 | 7.2 | 7.3 | 6.7 | 7.5 |
| 3 | 16.1 | 11.7 | 11.3 | 10.6 | 9.8 |

The given numbers are values for the remission of the exposed image parts, the remission of a magnesium oxide standard being 100 as a comparative value. The higher the numbers the higher is the remission or the lower is the color depth or the contrast of the measured samples.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Negative-working two-component diazo-type material comprising a light-sensitive composition in a coating on a support, said composition comprising:

a. a light-sensitive aromatic diazo-N-sulfonate;

b. an azo coupler component;

c. a polyether of a dihydric aliphatic alcohol wherein said polyether is selected from the group consisting of polyethylene glycol, polypropylene glycol, and polybutylene glycol; and a basic compound in an amount sufficient to maintain said composition at an alkaline pH.

2. Material according to claim 1 wherein said polyether is present in said composition in a weight ratio with said diazo-N-sulflonate of between about 0.25:1 to 10:1.

3. Material according to claim 2 wherein said polyether is a polyethylene glycol of a molecular weight between about 400 and 10,000.